May 27, 1952  H. W. LORD  2,598,399
ELECTRIC BALLAST
Filed Feb. 28, 1947
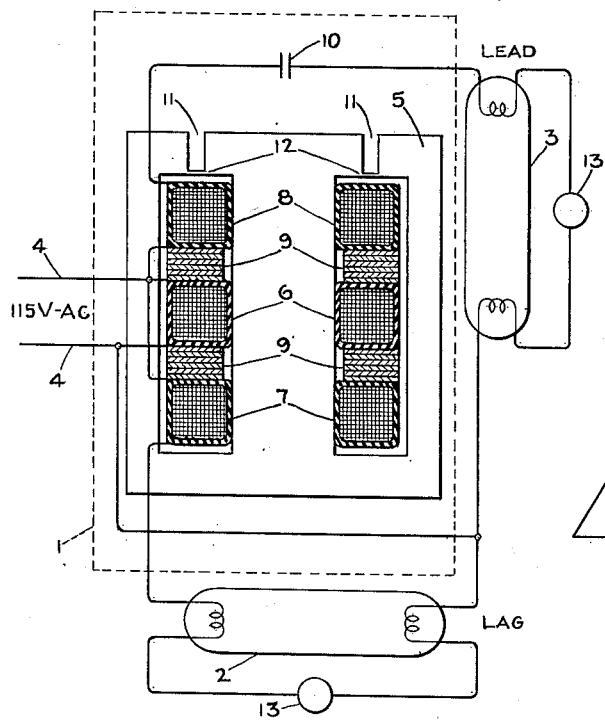
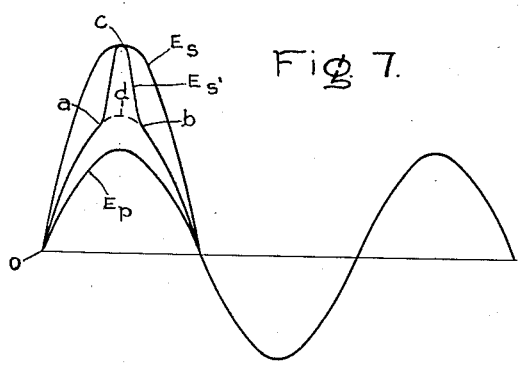
Inventor:
Harold W. Lord,
by Ernest C Britton
His Attorney.

Patented May 27, 1952

2,598,399

UNITED STATES PATENT OFFICE 2,598,399

ELECTRIC BALLAST

Harold W. Lord, Schenectady, N. Y., assignor to General Electric Company, a corporation of New York Application February 28, 1947, Serial No. 731,559

3 Claims. (Cl. 171—97)

This invention relates to ballasts for electric discharge devices and more particularly to improvements in ballasts of the reactance transformer type for fluorescent lamps which operate with leading current.

A reactance transformer is one in which the primary and secondary windings are loosely coupled so that when the transformer is carrying load there is a substantial amount of leakage flux and the voltages induced in the windings by this leakage flux cause the transformer to have a relatively high effective series reactance or what is commonly known as leakage reactance. The usual way of constructing such a transformer is to mount the primary and secondary windings on different parts of the magnetic core and provide a magnetic shunt between the windings for providing a path for the leakage flux. The magnetic shunt is usually provided with a gap so that the open circuit secondary winding voltage of the transformer will be substantially determined by the turn ratio.

It is frequently desirable to operate such a ballast with leading current. One of the reasons for doing this is to improve the power factor. Thus, a circuit operating with leading current can be effectively paralleled at the input, with a similar circuit operating with lagging current so that the two will amount to a relatively high power factor load. Another reason is that with two lamps close together, one of which operates with leading current and the other of which operates with lagging current, the stroboscopic effect of the light is materially decreased. The usual way of operating such a ballast with leading current is to connect a capacitor in series with the secondary winding and the lamp. In a typical circuit of this kind, the secondary winding voltage is approximately double the primary winding voltage and the reactance of the capacitor is approximately double the leakage reactance of the transformer.

I have found that such a leading current circuit does not operate as well as an equivalent lagging current circuit in which the capacitor has been omitted and, among other things, the life of a leading current lamp is less than the life of a lagging current lamp. I believe this is due to the fact that the flux produced by the secondary winding in its part of the core due to the leading load current is more or less in phase with the exciting flux from the primary winding. Consequently, the flux in the secondary part of the core is higher than the flux in the primary part of the core and if both parts of the core have the same cross sectional area, then the secondary part of the core saturates and produces non-sinusoidal wave shapes which are harmful to the life of the lamp. If the cross section of the secondary part of the core is increased so as to keep the flux density the same in both parts of the core under leading load current conditions, then the cost and size of the transformer is materially increased. This increase in cost is not only due to the increase in amount of iron necessary but also to the increase in the amount of copper necessary for the secondary winding because its mean length of turn will have to increase due to the increase of cross section of the secondary part of the core.

In accordance with this invention, I have overcome the above difficulty by providing the secondary winding part of the core with a gap or increased reluctance section. This gap makes it possible to eliminate saturation in the secondary part of the core while keeping the cross section of the secondary part of the core relatively small and of no greater size than the cross section of the primary part of the core of a lagging current ballast for an equal size lamp. By the term "gap," I wish to be understood as including both a complete gap in which the magnetic material is completely discontinuous at a point or points and a so-called bridged gap in which a part of the gap is bridged by a restricted section of magnetic material. Both types of gaps are suitable for use with my invention under different operating conditions.

An object of the invention is to provide a new and improved electric ballast.

Another object of the invention is to provide an improved reactance transformer ballast for use with fluorescent lamps which operate with leading current.

Another object of the invention is to provide an economical ballast for leading current discharge device circuits.

A still further object of the invention is to prevent magnetic saturation in a relatively small size, inexpensive, reactance transformer ballast for leading current circuits.

The invention will be better understood from the following description taken in connection with the accompanying drawing and its scope will be pointed out in the appended claims.

In the drawing, Fig. 1 is a diagrammatic illustration of an embodiment of the invention; Figs. 2, 3, 4, 5 and 6 are vector diagrams for explaining the invention, and Fig. 7 is a wave shape diagram for explaining a feature of the vector diagram shown in Fig. 5.

Referring now to the drawing and more particularly to Fig. 1, a preferred form of ballast embodying my invention is shown in the dotted outline box 1. This is a so-called two-lamp ballast for operating duplicate lamps 2 and 3 which may be placed side by side in a household floor, or desk lamp. Lamp 2 operates in a lagging current circuit and lamp 3 operates in a leading current circuit. The magnitude and power factor of the currents of the two lamps are both about equal so that the power factor of the over-all load with respect to a supply circuit is relatively high. The supply circuit for the ballast is indicated at 4 and may be a conventional 115 volt, 60 cycle alternating current circuit. The reactance transformer comprises a shell type core 5 having a primary winding 6 disposed on its winding leg at about the center thereof. On opposite sides of the primary winding are a lagging circuit secondary winding 7 and a leading circuit secondary winding 8. Magnetic shunts in the form of lamination pieces 9 are inserted between the primary winding and each of the secondary windings and these laminations are fitted rather loosely into place so that there are gaps of non-metallic spacers between their ends and the adjacent parts of the core 5. In a typical ballast of this kind the number of turns of all three windings is about the same. The lagging current lamp 2 is connected across the windings 6 and 7 in series so that in effect these windings constitute an autotransformer. Likewise, the leading current lamp 3 is connected across the windings 6 and 8 in series through a capacitor 10.

Strictly speaking, the secondary winding of each autotransformer consists of the primary winding 6 and the winding 7 or the winding 8, as the case may be, so that it is more accurate to refer to the windings 7 and 8 as extended reactor windings because in a sense they are extensions of the primary winding 6 and in another sense they are separate reactors which are in series with the loads on their respective circuits.

Located in the part of the core 5, which is transversed by the flux threading the winding 8, are one or more gaps 11 which are shown as provided with bridging magnetic members 12. The lamps 2 and 3 are shown as being provided with starters 13 of any suitable type.

The operation of the illustrated embodiment of the invention will best be understood by reference to the accompanying vector diagrams. At the outset, however, it should be stated that these vector diagrams are not wholly accurate because for one thing the voltage wave shape of the lamps 2 and 3 is rectangular rather than sinusoidal, and for another thing this magnetization characteristic of the core material is not linear. However, it is believed they are sufficiently accurate to give a correct qualitative picture of the operation.

Assume now that the supply circuit 4 is energized and that the lamps 2 and 3 have been disconnected or are not present. Fig. 2 then shows the voltage relationships in the windings of the two transformers under these open load circuit conditions. The vector $E_p$ is the voltage of the primary winding 6 and this equals the voltage of the supply circuit 4. Vector $E_{x-r}$ is the open circuited induced voltage of each of the extended reactor windings 7 and 8 and, as shown, it is approximately equal to the supply voltage. The sum of these two vectors is equal to the open circuit secondary or output voltage of the two autotransformers and is equal to the voltage which will be initially impressed upon the two lamps when they are connected in circuit.

Fig. 3 shows the vector voltage relations in the lagging current circuit during operation of the lamp 2. With this lamp connected as shown, the voltage vector of the extended reactor winding 7 swings to the position shown by the vector $E'_{x-r}$ and the sum of vectors $E_p$ and $E'_{x-r}$ is equal to $E_{lamp}$, the voltage of the lagging lamp when it is operating. The vector $E'_{x-r}$ is equal to the sum of $E_{x-r}$ and the vector $E_{l-r}$, the latter being the leakage reactance voltage drop in the transformer. In other words, under load conditions, the voltage $E'_{x-r}$ of the winding 7 is equal to the voltage induced in it combined with the leakage reactance voltage drop in it. It will be seen that the voltages $E_{x-r}$ and $E_{l-r}$ are more or less out of phase and that the voltage $E'_{x-r}$ is about equal to the no load induced voltage in winding 7. In other words, the flux in the part of the core surrounded by the winding 7 is about the same under open circuit conditions as under load conditions.

Fig. 4 illustrates the operation of the leading part of the circuit of a conventional ballast which is not provided with gaps 11. Here, the leading current through the leakage reactance of the transformer increases the voltage of the winding 8 so that $E_{x-r}$ and $E_{l-r}$ are more or less in phase and their resultant $E''_{x-r}$ is more than twice as great as $E_{x-r}$. In other words, the voltage of the winding 8 and hence the flux through it has been very materially increased and it is this latter effect which causes saturation of the part of the core upon which winding 8 is mounted. The vector $E_c$ is the capacitor voltage, which subtracts from the reactor voltage, and the voltage of the leading lamp is designated by $E_{lamp}$. The effect of the gaps 11 is shown by Figs. 5 and 6 which illustrate respectively the no load and full load operation conditions.

In Fig. 5, the voltage $E_p$ of the primary winding 6 remains exactly the same as the Figs. 2, 3 and 4. However, the voltage $E_{x-r}$ of the winding 8 is substantially reduced from the value shown in Fig. 4 because the gaps 11 decrease the amount of exciting flux from the primary winding 6 which can go through the part of the core which is devoted to the winding 8. In other words, the gaps 11 cause a greater proportion of the flux in the primary winding 6 to go through the magnetic shunts 9 than if the gaps 11 were not present. However, if the gaps are provided with the bridges 12, then there will be voltage peaks induced in the winding 8 which may attain higher instantaneous values than the maximum value of the voltage induced in the winding 8 if there were no gaps 11 present at all. This can best be illustrated by the wave shape diagram shown in Fig. 7 where the sine wave $E_p$ is the voltage of the primary winding 6. The sine wave $E_s$ is the secondary voltage of the transformer if no gaps 11 are present. As shown, this is also a sine wave which has substantially twice the maximum value of the primary voltage $E_p$. The intermediate curve labeled $E_{s'}$ is the secondary voltage of the transformer when it is provided with a bridged gap. In this curve from the zero point to the point $a$, the bridge 12 is saturated. From the point $a$ to point $b$, the bridge is unsaturated, the peak value $c$ being the point at which the flux is actually zero but is changing at its maximum rate. The sharp peak $acb$ is actually provided by the desaturation of the shunt 12 which causes the flux to change at a rate which is substantially greater than that of a sine wave. If the bridge 12 were not present, the points $a$ and $b$ would be connected by a line $d$ which would follow the sine wave shape of the curved $oadb$, etc. and this would represent the sum of the vectors $E_p$ and $E_{x-r}$ in Fig. 5.

Fig. 6 shows the vector voltage relations in the lead part of the system when the gap 11 is present and is to be compared with Fig. 4 for showing the effect of the gap on the operation of the lead circuit. The voltage $E_{l-r}$ adds to the open circuit induced voltage $E_{x-r}$ in the extended reactor winding 8 to produce the resultant voltage $E''_{x-r}$ of the extended reactance winding 8. Subtracted from this is capacitor voltage $E_c$ and the resultant of all these voltages is the lamp voltage $E_{lamp}$ which is the same as in Fig. 4. It will be observed from Fig. 6 that $E''_{x-r}$ is very much smaller than in Fig. 4 and that it is about equal to $E_p$, thus showing that the fluxes in the two parts of the core most intimately associated with windings 6 and 8 are substantially equal.

From the above description, it will be seen that the present invention makes it possible to operate a two-lamp reactance transformer ballast having substantially equal amounts of core iron for all of the windings at substantially equal flux density in all parts of the core, that is to say, in both the lead and lag circuit parts of the core.

It will, of course, be understood that the invention is not limited to combined lead and lag or so-called two-lamp ballasts and that it may also be used with separate lead circuit ballasts. That is to say, the winding 7 with its shunts 9 and the lag lamp 2 can obviously be omitted from Fig. 1 and the lead circuit will still operate in the manner described.

The bridges 12 are not required with so-called normally closed starting switches for the lamps. With such starting switches, the cathode heaters for the lamps are connected in series across the output of the ballast or reactance transformer during starting. This preheats the cathodes and causes the output voltage of the ballast, that is to say the voltage impressed on the short circuited lamp; to be the closed or load circuit voltage of the ballast. When the normally closed starting switch opens, there is, therefore, sufficient voltage for starting the lead lamp. In other words, at the instant the normally closed starting switch opens, the voltage available for breaking down the lamp will be the vector sum of $E_p$ and $E''_{x-r}$ in Fig. 6. On the other hand, with so-called glow switch starters or for cold cathode starting of the lead lamp, the most economical construction will probably be that which has bridges 12 because it is one or more of these bridges which causes the open circuit peak voltage described in connection with Figs. 5 and 7 which is useful for breaking down and starting the lamp.

While there have been shown and described a particular embodiment of the invention, it will be obvious to those skilled in the art that changes and modifications can be made without departing from the invention and therefore it is aimed in the appended claims to cover all such changes and modifications as fall within the true spirit and scope of the invention.

What I claim as new and desire to secure by Letters Patent of the United States is:

1. In combination, a magnetic core, a primary winding and two secondary windings on said core, said primary winding being between secondary windings, said core including magnetic leakage flux paths between said primary winding and both of said secondary windings, said core including a high reluctance restricted section of magnetic material on the secondary winding side of the leakage flux path which is between one secondary winding and said primary winding, said last-mentioned secondary winding and said primary winding being autotransformer connected for operating a leading current electric discharge lamp circuit, the other secondary winding and said primary winding being autotransformer connected for operating a lagging current electric discharge lamp circuit.

2. A two-lamp ballast for lead and lag fluorescent lamps comprising, in combination, a single phase shell type core, a primary winding on the center leg of said core, gapped magnetic shunts extending between said center leg and the outer legs of said core on both sides of said primary winding, an autotransformer connected lag secondary winding on one end of said center leg, an autotransformer connected lead secondary winding on the other end of said center leg, a capacitor connected in series with said lead secondary winding, a gap in said core on the lead secondary side of the magnetic shunt, and a bridge of magnetic material across said gap, said bridge being of restricted cross sectional area relative to the cross sectional area of the core on each side of said gap.

3. An electric ballast comprising, in combination, a magnetic core having a primary section and two secondary sections, said secondary sections being symmetrically disposed relative to said primary section, said sections having substantially the same cross sectional area, a gap in one secondary section, a bridge of magnetic material across said gap, said bridge being of restricted cross sectional area relative to the cross sectional area of the core on each side of said gap, magnetic shunts separating said sections, a transformer winding on said primary section, a capacitor, a lead secondary winding on the secondary core section which is provided with a gap, said lead secondary winding being connected in series with said capacitor, and a lag secondary winding on the other secondary core section.

HAROLD W. LORD.

REFERENCES CITED

The following references are of record in the file of this patent:

UNITED STATES PATENTS

| Number | Name | Date |
|---|---|---|
| 1,895,231 | Pearson et al. | Jan 24, 1933 |
| 2,170,456 | Lord | Aug. 22, 1939 |
| 2,225,052 | Holslag | Dec. 17, 1940 |
| 2,298,935 | Freeman | Oct. 13, 1942 |
| 2,334,587 | Short | Nov. 16, 1943 |
| 2,382,638 | Keiser et al. | Aug. 14, 1945 |